United States Patent Office

3,097,120
Patented July 9, 1963

---

3,097,120
GELLED AMMONIUM NITRATE EXPLOSIVE CONTAINING POLYACRYLAMIDE AND AN INORGANIC CROSS-LINKING AGENT
Joseph A. Hoffman, Bound Brook, N.J., and Herbert L. Bowkley, New Castle, Pa., assignors to American Cyanamid Company, New York, N.Y., a corporation of Maine
No Drawing. Filed Aug. 11, 1961, Ser. No. 130,774
10 Claims. (Cl. 149—49)

This invention relates to improved aqueous-gel, explosive compositions. More particularly, it is concerned with aqueous, non-settling ammonium nitrate explosive compositions containing a cross-linked polymer of acrylamide as a gelling agent.

Ammonium nitrate explosive compositions in the form of slurries, ordinarily using water as the liquid component, have become the subject of increasing commercial interest. United States Letters Patent No. 2,930,685, for example, shows a wide variety of typical aqueous slurry-type explosive compositions containing ammonium nitrate and a sensitizer such as trinitrotoluene (TNT) as well as other materials commonly encountered in the art.

Such slurries separate very rapidly into definite layers, each containing differing proportions of the various components. In the same patent, to overcome this problem, the use of such water-flow retardants as wheat flour, guar gum, cereal products or pre-gelatinized starch is recommended. Although such materials do increase the viscosity, they do not control the settling tendency to a sufficiently satisfactory degree for general use in the field.

In British Patent 825,367, published December 16, 1959, this problem also is recognized. Various aqueous explosive compositions using nitrocellulose to produce gellation are described. That such compositions may contain ammonium and/or metallic nitrates is noted, as is the suggested use of some hydrophilic colloid material such as dextrin, carboxymethyl cellulose or other cellulose derivatives, alginates, pectins and the like, as gel-forming substances.

It would seem simple, therefore, to substitute a gel-forming material from the latter for the ineffective retardants in the aqueous slurries of the former. Unfortunately, both the seeming relationship and simplicity of substitution are more apparent than real. When it is attempted to do so, it is found that the resultant gel, while perhaps satisfactory in the specific compositions of the British patent, will not prevent objectionable layering in compositions such as those of the first reference. In some cases also, the gel actually interferes with the commerical utilization of the resulant composition as an industrial explosive.

To be suitable for their intended use, such slurries or gels must possess sufficient fluidity to permit easy handling. Moreover, they must maintain such uniform consistency, fluidity and the like during prolonged magazine storage. The latter may involve wide variations in temperature, including such adverse conditions as freezing.

Previously-known compositions, including those in which gel-forming materials of the British patent are substituted for the retardants of the United States patent, all show deficiencies in one or more of these respects. For example, most, if not all, such compositions on standing still tend to separate into the heterogeneous mixtures. The latter are difficult to handle, unreliable in use and cannot be poured as an adequately uniform composition. Some, without overcoming the separation problem, become too stiff and lack the requisite fluidity. In a number of instances, separation occurs in as little as one to ten minutes, others occur overnight and some only after several days. In most, the instability against separation is aggravated by adverse temperature conditions. In a number of instances, separation may be hastened as a result of bacterial action. Some few do appear physically sutiable but the composition fails to retain its necessary industrial explosive properties.

It is a principal advantage of the present invention that an aqueous explosive nitrate composition has been produced which is not subject to the major difficulties afflicting those compositions which have been used or proposed in the past.

In general, this result has been obtained by modifying previously-known aqueous slurry compositions. This is done by addition thereto of a suitable acrylamide polymer which has been cross-linked in the presence of the other ingredients. The resultant composition has an excellent combination of those characteristics desired in an industrial explosive of this type. It retains sufficient mobility to permit pouring. It is, nevertheless, a definite physical composition which retains its uniform distribution even after many months in magazine storage.

In general, the essential ingredients of a typical composition according to this invention may be tabulated in the following way:

| Component | Content range (weight percent) | |
|---|---|---|
| | General | Preferred |
| Ammonium nitrate | 25–60 | 30–40 |
| Metal nitrate | 5–25 | 22–24 |
| Sensitizer | 15–50 | 28–32 |
| Water | 5–25 | 8–15 |
| Polymer | 0.1–5 | 1–2 |
| Metal salt | 0.01–0.5 | 0.1–0.2 |

In the foregoing tabulation, two sets of content ranges are given. One is the wider range over which the content of one particular ingredient may be varied and still obtain a useful composition. The second range limits each ingredient which will be generally encountered and which in most cases will be found to constitute, not only good, but preferred practice.

However, when the content of one ingredient, for example ammonium nitrate (hereinafter for simplicity abbreviated as AN) has been selected within the indicated range, particularly near the upper or lower end of the range, the other ingredient contents must be proportioned accordingly. They may not for example then all be taken as the minimum or maximum values in the same composition. Preparation of a suitable composition within the scope of the present invention cannot ordinarily be accomplished simply by selecting at random some value for each ingredient that will fall within the indicated ranges. For optimum results it must be recognized that there is an inter-relation of the optimum proportions of the various ingredients which correspond to a particular content of any single ingredient. In some instances, also, certain criteria must be observed in selecting not only the amount of any one particular ingredient but also as to its physical characteristics. Accordingly, these several ingredients will be individually discussed. Consideration of the individual ingredients in the following discussion does not coincide with the order of presentation in the foregoing tabulation.

Since in their original conception, the most unusual characteristic of such compositions was the presence of water, it will be discussed first. A certain minimum amount of water is essential to obtain the intended beneficial result. Ordinarily, this will be above five weight percent of the total composition. It is equally obvious that an excessive amount of water would defeat the object of its introduction. In general, this is about 25% of the final composition. In general, compositions containing the optimum combination of desirable qualities will contain from about eight to about fifteen weight percent of water, introduced as such or in combination with one of the other components.

Perhaps the next most characteristic ingredient of such compositions is the AN. In fact, it was the original purpose of producing aqueous explosive compositions to utilize an ingredient such as AN. Ordinarily, therefore, the AN content will be as high as is consistent with obtaining the desired explosive characteristics.

In the foregoing tabulation, the AN content is indicated as ranging from about 25% to about 60% by weight of the final composition. In general, however, it will be found that the best practice is to use an amount from about 30 to about 40%.

It is an advantage of the present invention that the AN used need not be highly pure, nor in general is it limited to use of AN in any particular particle size range. Fertilizer grade AN is entirely satisfactory. Usually such material is prilled to insure, so far as possible, that the material is in, and will remain in, a flowable dry state. Usually such prilled products range in particle size from about 10 to about 20 mesh for the major portion, there being somewhat larger particles usually present and usually also a somewhat larger amount of finer particles. An entirely satisfactory explosive composition according to the present invention may be made when the AN content is comprised of such a commercially-available mixture. The small amount of material which is usually added to minimize pick-up of moisture from the air or to resist caking or dusting does not interfere with the use for the present purposes.

In some cases it may be desirable to include as a part of the AN content, AN particles which are considerably smaller in particle size. These will be referred to herein for simplicity as "AN-fines." In general, where these AN-fines are present, they will be in the particle size range from about −20 mesh to about +100 mesh on the U.S. standard screen size table. These AN-fines may be present in as little as the amounts normally found in the commercial grade of prilled product. In some cases they may comprise substantially the total AN content.

One or more metal nitrates usually are found as characteristic ingredients in such compositions. In most cases it is sodium nitrate. These were originally incorporated to act as oxygen carriers. In the present invention they have an additional valuable function in that they seem to impart additional strength to the final gelled composition.

As seen from the foregoing tabulation, the general range over which the content of these nitrates may vary is itself a rather broad one. In general, an amount anywhere within this range may be employed. The amounts noted above as constituting the preferred range will be found to constitute a good, average practice.

A further advantage of the present invention is that it is not necessarily limited to any one particular sensitizer. This includes such materials as smokeless powder, trinitrotoluene (TNT) and other known nitrated equivalents. These are available in various commercial forms, both as such and in various admixtures such as the group of compositions commonly referred to as "tols." As shown in the tabulation above, these may be present in amounts from as low as about 15% to as high as about 50%. In compositions using the smokeless powder type, somewhat larger amounts may be necessary then when using TNT or equivalents thereof, in some cases extending up to the indicated 50%. In general, other types will seldom be used in excess of about 45%.

The amount used is affected not only by the particular sensitizer to be used but to a considerable extent by its particle size. For example, when using smokeless powder of large size, i.e., above about 20 mesh, a minimum amount of about 25% will be required. Usually somewhat less TNT will be successful in otherwise similar compositions. Expressed in other terms the AN:sensitizer weight ratio normally will vary from about 2.5:1 to about 4:1, or more, depending on the particular sensitizer used and its particle size. Discussion relative thereto will be more fully amplified below.

In the preceding discussion, the ingredients commonly found in typical compositions have been discussed. A critical feature of the present invention, however, is in the specific nature of the gel-forming material used. Many different materials are physically capable of forming typical "gels" of one type or another. Those which appear to act in aqueous explosive compositions only to increase the apparent viscosity are found of little or no value. The resultant gel must be capable of retaining various ingredients in suspension in properly spaced relationship to each other. This relationship should be maintained for indefinite periods of storage. It should not be broken under physical conditions nor should it be readily subject to bacterial attack. In addition to all this, the final gel composition must remain sufficiently fluid, i.e., it must not be so excessively viscous that it cannot be caused to flow under field conditions.

In accordance with the present invention, only compositions utilizing certain polyacrylamides as the gelling constituent have been found satisfactory. Polyacrylamides having a widely-varying range of characteristics are well known. Of these, for the purposes of the present invention, only polyacrylamides having an apparent molecular weight of from about 1 to about 25 million are wholly satisfactory.

As is also well known, polyacrylamides may be hydrolyzed to introduce so-called "free acid" or "carboxy" groups. For the purposes of the present invention, it is necessary that there be present a satisfactory content of such free acid groupings. As a minimum, they should be present to about 0.1%. As a maximum 10% is found to be excessive. About 8% may be taken as a practical operating maximum. In good average practice it will be found that from about 1 to about 2% ordinarily constitutes the preferred range.

In use, it is necessary to include in the composition a cross-linking agent. Cross-linkages of the ionic type are preferable. In the present invention, their formation is effected by polyvalent metal salts. In general, aluminum salts are preferred for this purpose. However, other equivalent polyvalent metal salts such as those of chromium, iron, tin and the like have been used.

The particular anion used is not critical. Sulfates work very well and will be the salts most commonly encountered. Other useful anions include nitrates, chlorides and the like. In much of the following discussion, therefore, aluminum sulfate will be used as illustrative. It is to be understood, however, that it may be substituted by other equivalents within the scope of the discussion.

In selecting the amount of cross-linking agent to be used, the principal factor to be considered is the molecular weight of the polymer before cross-linkage. Using higher molecular weight polymers, as little as 0.01% of the weight of the polymer is often found adequate. For lower molecular weight polymers, up to about five weight percent of the composition may be necessary. As noted above, the preferred molecular weight range is usually from about five to about eight million. For polymers of this size, the amount of agent employed will be from about 0.1 to about 0.5 weight percent of the composition. In general, using a weight ratio of polyacrylamide to agent of from 8:1 to about 12:1 will be found a satisfactory practice.

To further illustrate the practice of the present invention, the following specific examples will be found helpful. These examples are intended for illustrative purposes. Therein all parts are expressed by weight and percentages as weight percent.

Polyacrylamide as used in these examples was a commercially-available product ranging from about five to about seven million in apparent molecular weight. From about one to about 1.5% of the units were hydrolyzed with formation of carboxylic groups.

In combining the constituent ingredients of the composition of the present invention, there is no completely critical order of addition except for the cross-linking agent. This component should be added last. Its addition very rapidly produces a visible change, resulting in the desired soft, viscous, but wholly cohesive gel. In general, the preferred practice is to combine the dry polyacrylamide with the remaining dry ingredients. Water is then added to produce the desired viscosity. A small amount of the water should be reserved until the remainder of the composition is blended. Since the nitrates have a negative heat of solution, supplying a compensating amount of heat to the mixing bowl is usually a desirable practice. The cross-linking agent is then dissolved in the remaining water and the resultant solution added.

*Example 1*

In accordance with the foregoing discussion, two gelled compositions were prepared having the following formulations.

| Component: | Content (%) Sample "A" | Sample "B" |
| --- | --- | --- |
| Ammonium Nitrate (fine) | 18.3 | 19.3 |
| Ammonium Nitrate (coarse) | 16.2 | 16.2 |
| Sodium Nitrate | 22.4 | 22.4 |
| TNT | 30.0 | 30.0 |
| Polyacrylamide | 0.36 | --- |
| Guar Gum | --- | 0.36 |
| Aluminum Sulfate | 0.03 | --- |
| Sodium Tetraborate | --- | 0.03 |
| Water | 12.0 | 12.0 |

For both samples, the ammonium nitrate fines, sodium nitrate, TNT and gelling agent were combined in the dry state in a drum mixer equipped with lifter blades. Substantially all the water, at room temperature, was added and mixing was continued for a short period. The coarse ammonium nitrate was then added and mixing again continued for an additional period. Finally, the metal salt cross-linking agent in the remaining water was added. The temperature of the mix had returned to about ambient temperature and mixing was further continued for about ten minutes to effect complete thickening and gelation.

Both sample "A" and "B" were evaluated and tested. In the case of sample B, the solid material separated out and settled in heterogeneous layers on standing overnight. Sample A retained good properties and resisted separation and layering during extended storage at ambient temperatures which varied during that period from as low as about minus 10° F. to as high as about 100° F.

The procedure of Example 1 was repeated substituting equivalent amounts of many other thickeners or gelling agents for the polyacrylamide. Such a wide variety of products as pre-gelled polyacrylamides; polyacrylamides having above 10% "free acid" groups; sodium carboxymethyl cellulose with aluminum sulfate; wheat flour, gelatin; polyvinyl alcohol, other natural gums, synthetic "gums" and a number of cereal product derivatives commonly used as thickeners all proved unsatisfactory.

*Example 2*

The procedure of Example 1, Sample "A," was repeated substituting for the TNT sensitizer a commercially-available smokeles powder in the following formulation.

| Component: | Wt. percent |
| --- | --- |
| AN [1] | 34.73 |
| NaNO$_3$ | 22.58 |
| Smokeless powder [2] | 30.22 |
| Water | 12.08 |
| Polyacrylamide | 0.36 |
| Al$_2$(SO$_4$)$_3$ | 0.03 |

[1] Commercial grade prills paraffin coated.
[2] 20 mm. (85% nitrocellulose, 10% dinitrocellulose, 5% plasticizer and stabilizer).

The resultant gel explosive composition, both in storage and use, was substantially the equivalent of the composition of Example 1.

*Example 3*

In order to illustrate the effect of sensitizer particle size, Example 2 was repeated using as the sensitizer smokeless powder ground to varying particle size range. The following formulation was used throughout.

| Component: | Wt. percent |
| --- | --- |
| AN | 33.0 |
| NaNO$_3$ | 21.36 |
| Smokeless powder | 30.00 |
| Water | 15.00 |
| Polyacrylamide | 0.40 |
| Al$_2$(SO$_4$)$_3$ | 0.04 |

Samples were detonated to determine the minimum effective amount of primer (pentolite) and the critical diameter measured. Illustrative results are shown below.

| Screen size [1] | Minimum primer [2] | Critical diameter [3] |
| --- | --- | --- |
| −30 +40 | 10 | 2 |
| −40 +60 | 10 | 1½ |
| −60 +80 | 5 | 1 |
| −80 +200 | 5 | 1 |

[1] U.S. Standard. [2] Grams. [3] Inches.

It is clearly seen that the sensitivity increases with decreasing particle size. Accordingly, when the sensitizer is largely coarse grained, i.e., above 20–30 mesh, a minimum of about 25% should be used, particularly in the case of smokeless powder, a good average practice being to employ from about 28 to about 32% by weight of the whole composition. In the case of TNT, these limits usually may be smaller by some three to ten percent of the total composition. Hence, the lower limits as to sensitizer content and the higher AN:sensitizer ratios in the ranges discussed above.

*Example 4*

Example 1 was repeated except that the entire content of AN was in the prilled form. Again a substantially equivalent explosive combination is produced. Using 60 gm. of primer the critical diameter was below four inches.

In the foregoing examples, TNT and smokeless powder in commercial grades were used. Perhaps a more desirable but not essential variation is obtained if a sensitizer composition is separately blended and used for the purpose. In one preferred form, such a "sensitizer" composition comprises the following formulation.

| Component: | Wt. percent |
| --- | --- |
| Cyclonite [1] | 55.2 |
| TNT | 40.0 |
| Wax | 1.2 |
| Polyisobutylene | 3.6 |
| | 100.0 |

[1] Cyclotrimethylenetrinitramine.

Such compositions are used to replace the sensitizer in the gel compositions noted in the discussions above.

*Example 5*

To illustrate this use an explosive gel was prepared as in Example 1 but using the "composite" sensitizer composition noted immediately above to replace the TNT. The explosive gel had the following composition.

| Component: | Wt. percent |
|---|---|
| AN (coarse ground) | 40.00 |
| NaNO₃ | 24.56 |
| Sensitizer composite | 20.00 |
| Water | 15.00 |
| Polyacrylamide | 0.40 |
| Al₂(SO₄)₃ | 0.04 |
|  | 100.00 |

The sensitizer composite was used in varying screen size range. Using the minimum primer (pentolite) the critical diameter was determined. Illustrative results are shown below.

| Screen Size [1] | Minimum primer [2] | Critical diameter [3] |
|---|---|---|
| −10 +20 | 30 | 3 |
| −20 +30 | 20 | 3 |
| −30 +40 | 20 | 3 |
| −40 +60 | 20 | 2 |
| −60 +80 | 10 | 2 |
| −80 +100 | 10 | 2 |
| −100 | 10 | 2 |

[1] U.S. Standard.  [2] Grams.  [3] Inches.

Such compositions, like smokeless powder, have the advantage of increasing sensitivity as the average particle size decreases. In this respect they differ from sensitizers like TNT which have optimum efficacy between about 10 and 16 mesh and decrease in sensitivity as the average particle size is decreased below that range. Where increased sensitivity is important, this is an advantage of the composite sensitizers in that they provide for an added control in the ultimate product.

We claim:

1. A stable, soft, non-separating, explosive gel composition containing as its essential ingredients (a) from about 25 to about 60 weight percent of ammonium nitrate; (b) from about 5 to about 25 weight percent of an alkali-metal nitrate; (c) from about 15 to about 50 weight percent of a nitrated explosive sensitizer; from about 5 to about 25 weight percent of water; from about 0.1 to about 5 weight percent of a polyacrylamide, said polyacrylamide having an apparent molecular weight of from about one to about 25 million and a hydrolyzed free acid content of from about 0.1 to about 8%; and from about 0.01 to about 0.5 weight percent of an inorganic, polyvalent metal salt cross-linking agent for said polyacrylamide.

2. An explosive gel according to claim 1 in which said polyacrylamide has an apparent molecular weight of from about 5 to about 8 million.

3. An explosive gel according to claim 1 in which said polyacrylamide has a hydrolyzed free acid content of from about one to about two percent.

4. An explosive gel according to claim 1 in which the weight ratio of said polyacrylamide to said cross-linking agent is from about 4:1 to about 6:1.

5. An explosive gel according to claim 1 in which the weight ratio of ammonium nitrate to sensitizer is from about 2.5:1 to about 4:1.

6. An explosive gel according to claim 1 in which said cross-linking agent is a water-soluble salt of an inorganic acid and a metal selected from the group consisting of aluminum, iron, chromium and tin.

7. An explosive gel according to claim 1 in which said cross-linking agent is aluminum sulfate.

8. A stable, soft, non-separating, explosive gel composition containing as its essential ingredients (a) from about 30 to about 40 weight percent of ammonium nitrate; (b) from about 22 to about 24 weight percent of an alkali-metal nitrate; (c) from about 28 to about 30 weight percent of a nitrated explosive sensitizer; from about 8 to about 15 weight percent of water; from about one to about two weight percent of a polyacrylamide, said polyacrylamide having an apparent molecular weight of from about one to about 15 million and a hydrolyzed free acid content of from about one to about two percent; and from about 0.1 to about 0.2 weight percent of an inorganic, polyvalent metal salt cross-linking agent for said polyacrylamide.

9. An explosive gel according to claim 8 in which the weight ratio of said polyacrylamide to said polyvalent metal salt is from about 4:1 to about 6:1.

10. An explosive gel according to claim 8 in which the weight ratio of ammonium nitrate to sensitizer is from about 2.5:1 to about 4:1.

References Cited in the file of this patent

UNITED STATES PATENTS 3,000,175    Lawrence _____ Sept. 19, 1961

UNITED STATES PATENT OFFICE
CERTIFICATE OF CORRECTION

Patent No. 3,097,120                                            July 9, 1963

Joseph A. Hoffman et al.

It is hereby certified that error appears in the above numbered patent requiring correction and that the said Letters Patent should read as corrected below.

Column 5, line 33, in the table in Example 1, under the heading Sample "B", first line thereof, for "19.3" read -- 18.3 --.

Signed and sealed this 7th day of January 1964.

(SEAL)
Attest:

ERNEST W. SWIDER
Attesting Officer

EDWIN L. REYNOLDS

Acting Commissioner of Patents